United States Patent [19]

Potthoff

[11] 4,062,157
[45] Dec. 13, 1977

[54] DOCK SHELTER

[75] Inventor: David E. Potthoff, Fond du Lac, Wis.

[73] Assignee: Medalist Industries, Inc., Milwaukee, Wis.

[21] Appl. No.: 754,762

[22] Filed: Dec. 27, 1976

[51] Int. Cl.² .......................... E04F 10/04; E06B 1/56
[52] U.S. Cl. ............................... 52/173 DS; 135/5 A
[58] Field of Search ........................... 52/173 DS, 204; 135/5 A; 14/71

[56] References Cited

U.S. PATENT DOCUMENTS

| | | | |
|---|---|---|---|
| 3,403,489 | 10/1968 | Frommelt et al. | 52/173 DS |
| 3,557,508 | 1/1971 | Frommelt et al. | 52/173 DS |
| 3,613,324 | 10/1971 | Conger | 52/173 DS |
| 3,683,572 | 8/1972 | Alten | 52/173 DS |
| 3,772,839 | 11/1973 | Timbers | 52/173 DS |
| 3,792,559 | 2/1974 | Frommelt et al. | 52/173 DS |

*Primary Examiner*—J. Karl Bell
*Attorney, Agent, or Firm*—Joseph P. House, Jr.

[57] ABSTRACT

A dock shelter for effecting a seal between the rear end of a truck van and a building to keep out wind and rain comprises a frame having sides and a roof for enclosing the building opening. Flexible, but substantially self-sustaining, foam-filled sealing panels extend toward each other from the left and right inside of a substantially rigid frame to define an opening which is somewhat smaller than the expected width of the van. A partially foam-filled curtain also extends from the top of the frame and behind the left and right side panels. The top curtain has vertically extending stays which augment effecting a seal with the top of the van. The top curtain and the side panels cooperate to maintain the seal when the top corners of the van approach the building opening. The lower ends of the side panels are deflected into sealing relationship with specially shaped flexible foam filler blocks which are located inside of and near the bottom of the frame. The side panels have quilted reinforcements in areas that are subject to substantial abrasion.

13 Claims, 7 Drawing Figures

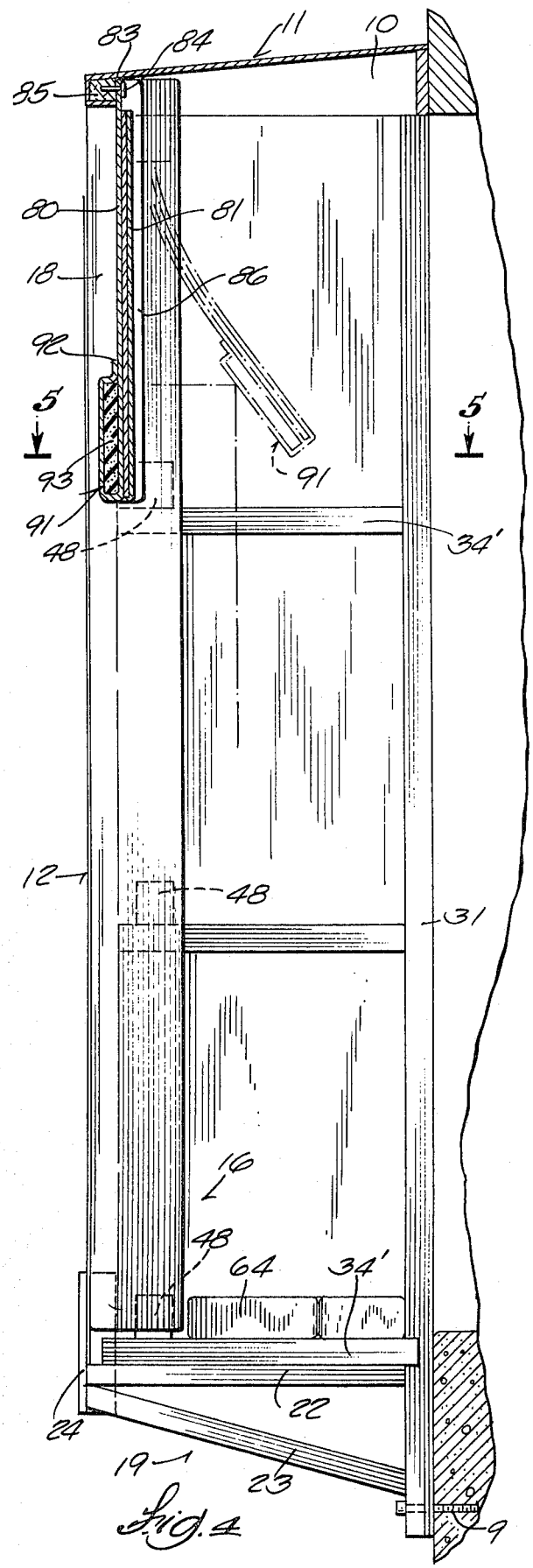
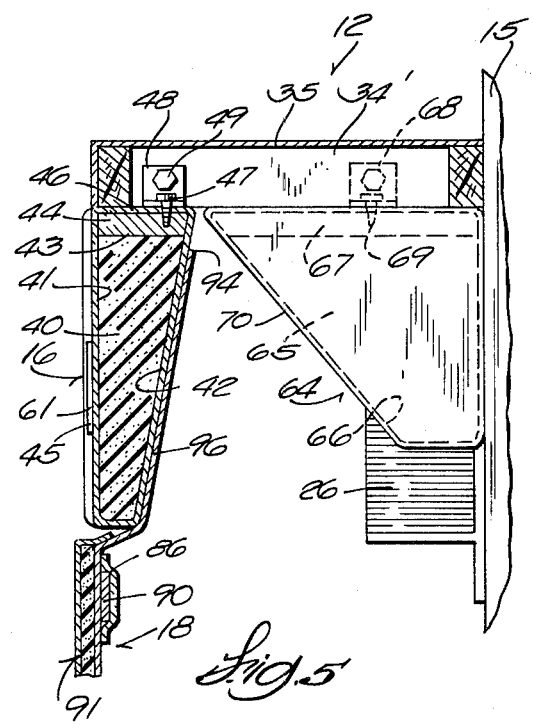
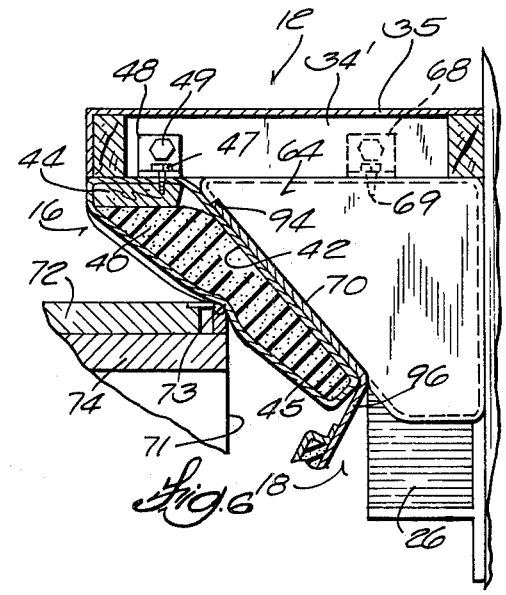
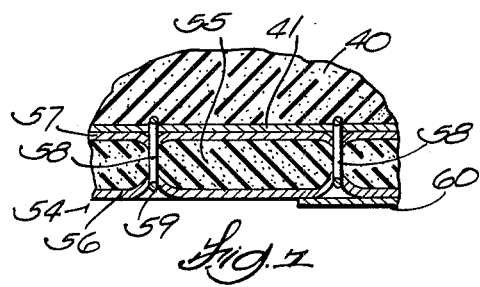

DOCK SHELTER

BACKGROUND OF THE INVENTION

This invention relates to what is commonly called a dock shelter whose purposes is to effect a seal against rain, snow and air currents between the body of a truck van and a building when a truck is being loaded or unloaded.

A variety of structures have been proposed for effecting a seal between a truck van and a building opening during loading and unloading operations. One generally known type of dock shelter or seal to which the improvements hereinafter discussed relate, comprises a substantially rigid frame that surrounds a door opening and has inwardly extending front side curtains and a top side curtain which defines an opening that is smaller than the expected dimensions of the van. U.S. Pat. No. 3,403,489 is an example. Traditionally, the curtains have been made of a water-repellant material such as canvas duck or rubber-impregnated nylon fabric. These materials are quite flexible so they are inclined to flap in the wind and lack the ability to maintain their shape which is a detraction from their functional and esthetic quality. Moreover, known types of prior art curtains are difficult to maintain in sealing relationship at their interfaces when the corners and edges defining the rear end of the van are pressed into them for the purpose of deflecting them and effecting a seal. They are also subject to being torn or abraded by the edges of the van repeatedly rubbing them. Hence, many different schemes have been proposed for reinforcing the curtains in their main areas of wear. Use of plastic sheets laid out in a shingle arrangement in the high wear areas represents one attempt to create a low friction reinforced area. Spring metal stays have been imbedded in the side curtains to obtain more compressive action by the curtain against the van and to overcome the inherent floppiness of ordinary fabric materials. A number of methods have been devised for producing a seal near the bottom edges of the side curtains such as letting the rear edge of the van run into stationary foam blocks. Although the above-mentioned problems have been addressed as indicated, their attempted solutions have not been considered satisfactory insofar as functionality, durability and esthetic qualities are concerned. The prior art also includes door seals having thick pads about the doorway and against which the truck backs. See U.S. Pat. Nos. 3,375,625 and 3,500,599, for example. In these devices the pads are compressed or deformed in use and are subject to heavy wear and abuse.

SUMMARY OF THE INVENTION

A general subject of the present invention is to overcome the above-noted defects and problems in prior art dock shelters.

Another object is to provide front side panels which do not require use of stays but which constitute substantially self-supporting pads which are thinner than the pads of U.S. Pat. Nos. 3,375,625 and 3,500,599 and which are hinged to side sections of the dock shelter frame. These pad panels swing inwardly as panel units about their hinged connection with the frame side sections to resiliently seal against the vehicle body. The pads desirably have a core of flexible foam covered by flexible sheet material such that the panels have the inherent qualities of a bendable beam which yields to develop a compressive or resilient return force under the influence of an entering van and which foam does not undergo significant deformation which might otherwise shatter it after repeated use.

A further object is to provide a top curtain having a pad along its lower edge. The pad comprises a foam core in a sheet material. The curtain has spring metal stays including some that are uniquely located for enhancing the seal between the top curtain and the side panels when they are deflected by entry of the rear of a van.

A still further object is to provide specially shaped filler blocks of flexible foam behind the lower edges of the side panels for the latter to swing into the blocks to effect a seal without subjecting the panels or the blocks to excessive compressive deformation.

How the foregoing and other specific objects of the improved dock shelter are achieved will be apparent from the following description of an illustrated embodiment of the invention which will now be set forth in reference to the drawings.

DESCRIPTION OF THE DRAWINGS

FIG. 4 is a vertical section taken on a line corresponding with 4—4 in FIG. 1.

FIG. 5 is a fragmentary cross section taken along the line 5—5 of FIG. 4 and showing the foam-filled top and side curtains and a trapezoidal shaped foam block or pad which cooperates to form a seal with a side curtain.

FIG. 6 is similar to FIG. 5 except that it shows the action and cooperation between the top curtain and the side curtain and between a side curtain and a lower sealing pad when a truck has entered the shelter.

FIG. 7 is a section of a side curtain taken on a line corresponding with 7—7 in FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
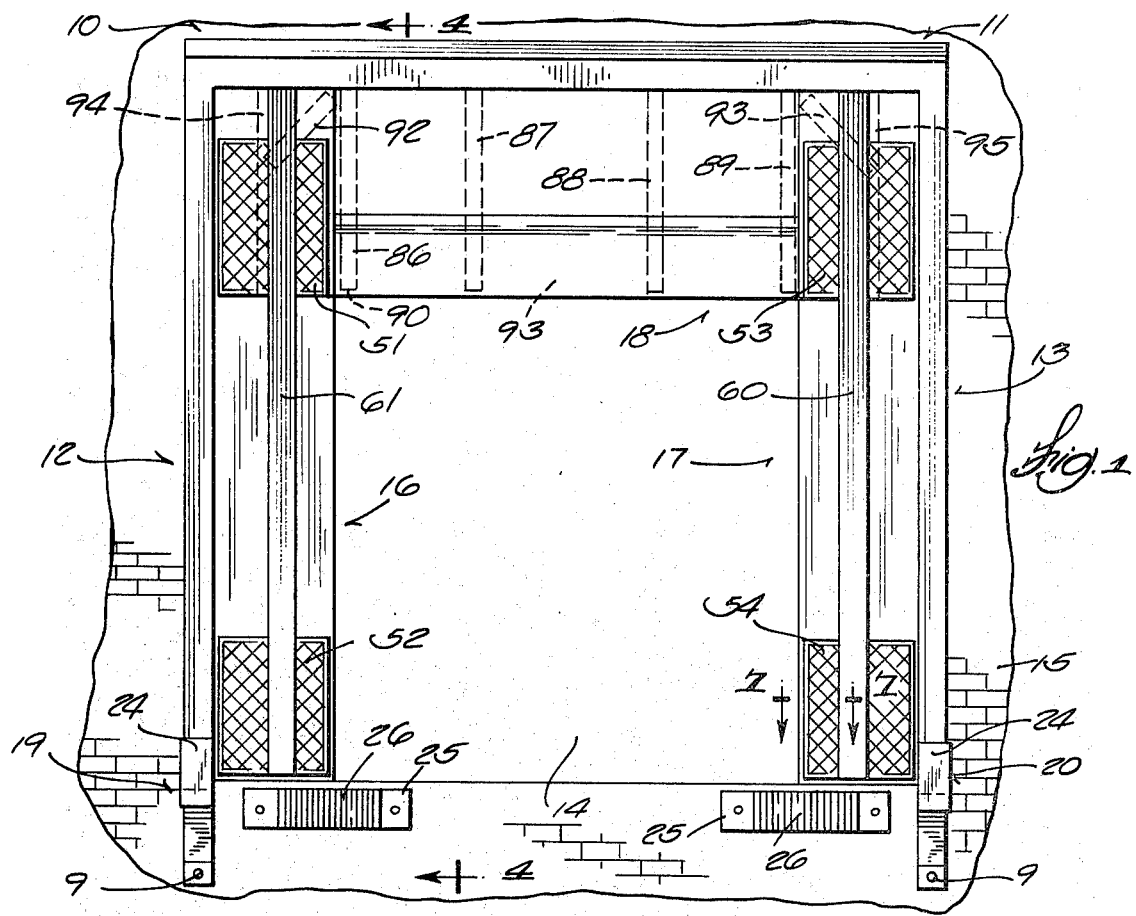
FIG. 1 is a front elevation view of a loading dock shelter having the improved features discussed herein.

Referring to FIG. 1, the dock shelter comprises a substantially rigid frame having a top 10, a roof 11 and left and right side sections which are generally designated by the reference numerals 12 and 13. The frame is adapted to be fastened to a building to surround an opening or door which is in line with the open area 14 of the shelter. The rear faces of the top and side portions of the frame 10, 12 and 13, respectively, interface with the outside wall of a building which is shown fragmentarily and marked 15.

Suspended within the frame and near the front thereof, as viewed in FIG. 1, are left and right side sealing panels 16 and 17 and a top curtain 18 which is behind the side panels and normally in contact therewith. The construction of the panels and curtain and their cooperation to effect a seal with the body of a truck van that is backed toward a loading door opening of the building to effect a weatherproof seal with the van will be described in detail later.

Figure 2:
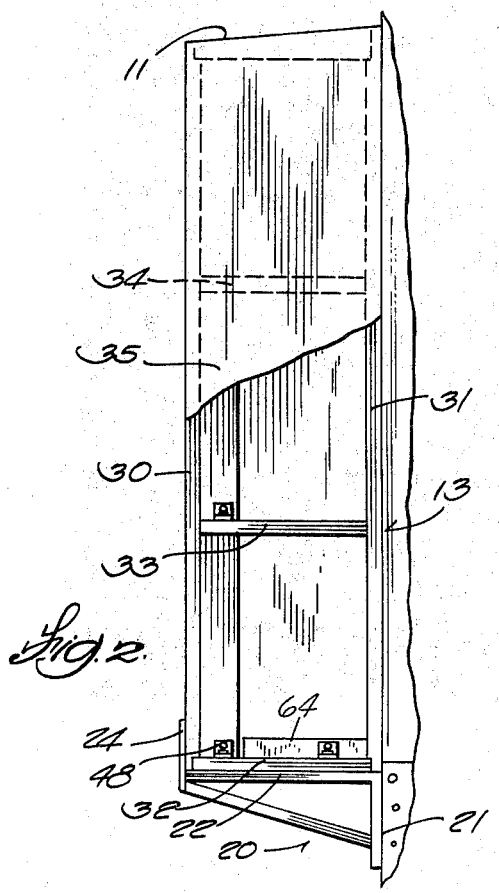
FIG. 2 is a side elevation of the shelter depicted in FIG. 1 where a translucent side panel is broken away to show how the frame for the shelter is constructed.
Figure 3:
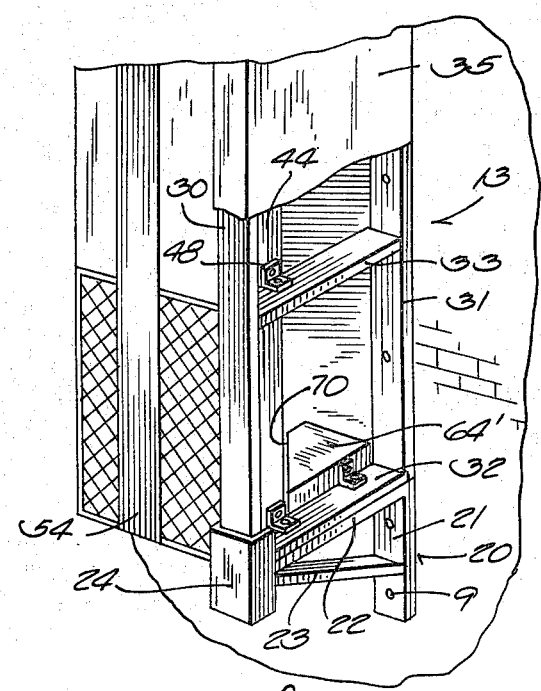
FIG. 3 is an enlarged fragmentary perspective view of the lower righthand corner of the shelter in FIG. 1 with parts broken away to show the internal construction.

As can be seen in FIGS. 1–3, the frame sides and top are fastened to the building and the frame is also supported on brackets 19 and 20. The details of a typical bracket 20 may be seen in FIG. 3 to comprise a rear portion 21 which is provided with holes for fastening the bracket to a building with any suitable means such as lag screws 9. The bracket has a top rail member 22 on which the frame 13 rests and it has a reinforcing bar or brace 23 which may be welded in place. The front of the bracket is provided with an angle section 24 whose front face serves as a bumper for limiting movement of a truck van toward the building.

As can be seen in FIG. 1, further protection against a truck van impacting the building is obtained with conventional bumper brackets such as those marked 25 which have rubber inserts 26 for absorbing impact.

The top 10 and side frames 12 and 13 may be prefabricated in the factory and mounted on the building wall as one of the first steps in an installation. Construction of a typical side frame 13 is clearly visible in FIGS. 2 and 3 where it is seen to comprise a preferably wooden front vertical stud member 30 and a rear vertical stud member 31 joined by several cross rail members such as those which are marked 32–34. The top frame section 10 may have essentially the same basic construction. It is important to note that the roof 11 is pitched in a direction away from the building. Thus, when the rear end of a van protrudes into the shelter defined by the frames and sealing curtains, water may drain from the roof of the shelter harmlessly onto the roof of the van from which it could drain in the normal fashion. This construction avoids the use of the commonly used hip roof which slants laterally and has overhanging eaves which may cause water to drain to the opposite sides of the frames and would negate one of the advantages of the present shelter construction which is to enable the shelters to be closely juxtaposed where loading dock building doors are closely spaced.

As can be seen particularly well in FIGS. 2 and 3, the side frames 12, 13 and top frame 10 are all covered with a soft and tightly stretched translucent sheet material 35 which, in a commercial embodiment, is a nylon reinforced vinyl material but any material which has comparable weather resisting, toughness and translucent properties may be used.

A typical side panel 16 will now be described in reference to FIGS. 1 and 4–6. First refer to FIG. 5 where a horizontal section of panel 16 may be visualized. The panel comprises a self-supporting relatively thin flexible pad including a core 40 of polyurethane foam or other flexible cellular or non-cellular material, which in this example, has a flat front face 41 and a beveled or tapered rear face 42. The generally triangularly shaped core has a base or edge face 43 which is fastened to a wooden batten, stud or strip 44 with any commercially available adhesive that is compatible with the selected flexible foam and wood. Wooden strip 44 provides a base for mounting the panel assembly. During manufacture, after the foam core 40 is adhered to strip 44, the assembly is covered with a tough sheet material such as one which has the properties of vinyl reinforced with nylon mesh or filament. In FIG. 5, the cover material is marked with the reference number 45. The seams, not shown, of covering material 45 are overlapped and sewn following manufacturing practices which are known to those skilled in the art of making waterproof enclosures.

Referring to FIG. 5, it will be noted that the base area 46 of the covering material which interfaces with wood strip 44 is provided with grommeted holes for receiving mounting screws 47. The mounting screws secure brackets 48 onto the edge of the curtain assembly. The bases of the brackets 48 rest on the cross members 32, 33, 34 of the side frames such as the cross member marked 34' in FIG. 5. Additional brackets such as 48 are shown in hidden lines in FIG. 4 and it will be recognized that the number of brackets corresponds with the number of cross members with which they may be engaged. The brackets are fastened to the cross members with nuts and bolts 49.

The side panels just described exhibit sufficient stiffness to maintain their shape and appearance of rigidity but are capable of yielding and, in effect bending as a unit as if it were hinged, to bear in sealing relationship against the back end of a truck van that strikes its front face 45. It also resists high velocity wind without deforming.

Each of the side panels 16 and 17 is built-up or reinforced in regions such as 51, 52 and 53, 54, respectively. A section of a typical reinforced region is shown in FIG. 7. The foam core is marked 40 and the front face of the covering material is again marked 41. The reinforcement may be characterized as quilted. It comprises a core 55 or filler of thin, high density foam such as, but not limited to, that which is known by the trade name "Ensolite". This material is contained inside of layers of covering sheet material 56 and 57 which are sewn together and may also be heavy vinyl reinforced with nylon. The reinforcing assembly is joined with the main part of the curtain which backs it by means of quilting ties or stitches 58. This results in recesses such as 59 being formed by the tightly pulled stitches and none of the tie material 58 extends beyond the front face of covering material 56 so there is nothing for a truck van backing into the reinforced area to catch on.

In FIG. 7 a part of a backing guide stripe 60 is also visible. The full length and location of the stripe may be observed typically on side curtain 17 in FIG. 1. Curtain 16 also has a stipe 61. These stripes provide a truck driver with a target to sight on in connection with guiding the rear end of the truck van centrally into the opening in the dock shelter which is defined by the inner edges of the side and top curtains.

In FIG. 5, one may see that there are trapezoidal shaped filler blocks or pads 64 in the corners defined by the side frame 12 abutting the outside of the building wall 15. These pads have a foam core 65 which may be flexible polyurethane foam or the like. The pads are covered with a heavy vinyl sheet material 66. The foam core 65 is secured with a suitable adhesive to a wooden block 67 and the core and block are both covered with the sheet material 66. These blocks 64 are mounted on the lowermost of the horizontal members 32 in the side frame with angle brackets such as 68 in FIG. 5. The brackets are previously fastened to the block 67 with suitable wood screws such as 69. The foam-filled pads 64 have rearwardly inclined front surfaces 70. Pads such as 64 are mounted at a level which is substantially coplanar with or a little above the lower margins of each of the side panels.

FIG. 6 illustrates how one of the side panels 16 cooperates with pad 64 to effect a seal in the bottom region of the dock shelter when the rear edge of a truck van 71 deflects the panel 16. In this example, the back door 72 of the van is swung through 270° on its hinge pin 73 into parallelism with a side wall 74 of the van. This results in rather sharp corners occurring on the truck, but the corners will generally engage the quilted reinforcement areas 51–54 on the side panels 16, 17 and no premature degradation of the curtain will result from repeated impacts by a van.

It is observed in FIG. 6 that when the van backs into the panels, the panels 16, 17 are deformed or indented by a minor amount but, due to the foam construction, the panel swings essentially as if it were mounted on a hinge. Said hinge comprises the interface between wood strip 44 and the face 43 of the foam core 40 and the yieldability of the foam adjacent said face. Panels 16, 17 typically swing through about 50° before they bottom on pads 64.

This action is significantly different from what happens in prior art dock shelters that simply use stationary thick blocks of foam material which can be squeezed by the edge of a truck van to form a seal. In such cases, the foam is usually deformed excessively and it has a tendency to degrade or tear in an undesirably short time. As can be seen in FIG. 6, however, in accordance with the invention, the foam-filled side panels 16, 17 simply swing, undergo minor compression, and result in a good seal being created between the covered face 42 of the door and the angular face 70 of the pad 64.

From the foregoing it is clear that the yieldable panels 16, 17 have their outboard or butt ends 43 hingedly connected to the edges of the rigid frame sections 12, 13 which are remote from the building wall 15. The inboard ends of the panels 16, 17 extend toward each other to define the opening through which the vehicle body enters the dock shelter. As the vehicle body engages the panels and faces them rearwardly, the panels 16, 17 swing as units about their hinged connection to the rigid side frames 12, 13. As compared to the side curtains of the prior art, panels 12, 13 are relatively stiff and resist wind pressure. The hinged connection is resilient to bias the panels against the vehicle body and restore the panels to their FIG. 5 position when the vehicle leaves the shelter.

The construction and function of top curtain 18 will now be described in reference to FIGS. 1 and 4 primarily. Referring to FIG. 4 where the top curtain 18 may be seen in cross section, it will be evident that it is constructed of sheet material that is folded back on itself to form a front face 80 and a rear face 81, or in other words, curtain 18 is basically a double ply sheet material which is sewed at its ends and at its upper edges such as in the region 82. At the upper margin 83, the curtain is provided with grommeted holes through which screws 84 may be inserted for supporting the curtain on a wood strip 85 to which the translucent roof 11 is also secured. The back face of curtain 18 has several vertically extending pockets such as those which appear in dashed lines in FIG. 1 and are marked 86–89. The pockets receive flat spring metal strips or stays which are not visible in FIG. 1. because their edges have substantially the same width as the interior of the pockets. One pocket 86 has the reference numeral 90 applied with a dashed lead line to indicate the presence of a metal stay 90 in that and the other pockets. The stays impart a degree of the rigidity to curtain 18 but they will flex rearwardly as viewed in FIG. 1 to provide for compressive sealing action of curtain 18 against the top of a typical pocket 86 and a stay 90 are shown in section in FIG. 5.

Referring again to FIG. 4, one may see that top curtain 18 is also provided with a horizontally elongated reinforcement pad 91 near its lower margin. This reinforcement pad comprises a cover, of a material similar to that of which the curtains are made, which is folded back on itself and sewed through the agency of a long tab 92 onto the double layers 80 and 81 of the curtain. The reinforcing pad 91 has a flexible foam core 93 which may be polyurethane foam. Pad 91 is disposed in the line of contact with the upper rear edge of the van 71, as shown in FIG. 4. It adds weight and bulk to the sealing zone between the van 71 and top curtain 18 and imposes the seal therebetween.

Besides having vertically directed pockets 86–89 for stays, top curtain 18 has at least a pair of pockets 92 and 93 which are at an acute angle with respect to vertical and which appear as dashed line rectangles in FIG. 1. The pockets located in the back side and upper regions of side curtains 16 and 17. Pockets 92 and 93 accommodate correspondingly sized flat spring metal stays. These stays contribute toward generating a compressive force between top curtain 18 and the side curtains 16 and 17 when the curtains are deflected or pressed rearwardly by entry of the trailing edges of a truck van into the dock shelter. In this manner, a more effective seal is created between top curtain 18 and side curtains 16 and 17 when a truck is in place.

It will be noted that the width of top curtain 18 is less than the width of the frame. The left boundary of the top curtain appears as a dashed line in FIG. 1 and is marked with the number 94 which the right edge indicated by a dashed line is marked 95. Top curtain 18 is behind side curtains 16 and 17 and normally fully interfaces with them, that is, when there is no truck van in the loading dock. With the side curtains 16 and 17 disposed in front of top curtain 18, wind or updrafts which undesirably cause prior art type curtains to flap and swing outwardly are resisted. The reinforcing pad 91 and the stays 86–89 also contribute toward obtaining this objective. Horizontally elongated pad 91 is limited in length to lie between the inboard ends of side panels 16, 17. Accordingly, the pad 91 does not interfere with the articulation of the panels 16, 17, as shown in FIG. 6.

As can be seen in FIGS. 5 and 6, the backing sheet material to top curtain 18 has a double ply extension or flap 96 which is substantially coextensive with the vertical length of top curtain 18 and is effective to close the gap and produce a seal between the inside surface 42 of the side curtain and the edge of the top curtain when the side curtain 16 is deflected as illustrated in FIG. 6.

The self-sustaining resilient panels 16, 17 which swing as panel units about their resilient hinged connections to the side frames and the top curtain with its pad 91 along its lower margin coact to provide an improved wind resistant enclosure about the vehicle body. The panels 16, 17 and pad 91 draw the top curtain 18 taut at the intersection thereof.

I claim:
1. A loading dock shelter comprising:
   frame means having opposed side members and a top member, said frame means being adapted for being fastened to a building wall adjacent the sides and top of a door opening therein and to project outwardly from said building,
   side panel means for being mounted on each of said side members to extend toward each other so their corresponding opposed inner edges define the sides of another opening that is aligned with said door opening, top curtain means for being mounted on said top member between said side panel means and said building, said top curtain means having opposite end regions and sufficient length for said end regions to extend beyond said inner edges of said side panel means, respectively, said side panel means each comprising a core of flexible material and flexible sheet material enclosing said core and having a base surface for being disposed along a side member and having front and rear surfaces at least one of which converges toward the other in a direction away from said base and toward said inner edges, the width of said core being sufficiently great for said core to swing without substantial compressive deformation while forming a seal with the body of a vehicle entering the opening between said panels.

2. The dock shelter as in claim 1 wherein said top curtain means has a plurality of vertically extending and laterally spaced apart pockets, and spring metal strips constituting stays disposed in and substantially coextensive with said pockets, said top curtain means also having pockets extending at an angle away from each of the aforesaid stays toward said bases of said side curtain means, respectively, and stays in said last named pockets.

3. The dock shelter as in claim 1 including:

reinforcing panels disposed on lower and upper front regions of said side panels for providing resistance to abrasion by the corners of a vehicle body, said reinforcing panels comprising flexible foam material extending over said regions and flexible sheet material covering said foam material, said flexible sheet and foam materials being stitched to said side panels and said stitches being tight enough to effect a quilted appearance with said stitches being in depressions such that they will not be engaged by a vehicle body bearing against said panels.

4. The dock shelter as in claim 1 including:

flexible pad means for mounting between each of said side panels and said building in the path in which said side panels swing, said pad means having an edge disposed at an angle for being engaged in sealing relationship by said side panels when it is swung to a corresponding angle.

5. The dock shelter as in claim 5 wherein said flexible pad means are comprised of a block of flexible foam material and a covering of flexible sheet material encasing said foam material.

6. The dock shelter as in claim 1 wherein said top curtain has pocket means comprises of flexible sheet material substantially coextensive with its lower margin and a strip of flexible foam material encased in said pocket.

7. The dock shelter as in claim 1 including a translucent flexible plastic sheet material fixed on said side frame members.

8. In a dock shelter having a substantially rigid frame including side frame sections for projecting outwardly from a building wall at the sides of a doorway and yieldable sealing panels extending from said frame sections toward each other in spaced relation to said wall whereby to yield and seal against a vehicle body interposed therebetween, the improvement in which said yieldable panels comprise substantially self-supporting vertically elongated pads, and resilient hinged connections between outboard edges of said pads and the said side frame sections whereby said pads are swingable as panel units about said hinged connections under pressure of an entering vehicle body and seal against said body under the pressure of said resilient hinged connections.

9. The dock shelter of claim 8 in which said frame is provided with filler blocks near the bottoms of said side frame sections, said blocks having rearwardly inclined front edges against which said sealing panels may abut when the panels are swung rearwardly about their hinged connections.

10. The dock shelter of claim 8 in which said sealing panel pads are tapered from their outboard ends toward their inboard ends whereby to be more flexible near their inboard ends.

11. The dock shelter of claim 8 in which said frame is provided with a top curtain having a horizontally elongated pad disposed adjacent its lower edge whereby to engage and seal against said vehicle body.

12. The dock shelter of claim 1 in which said top curtain has lateral margins disposed behind said sealing panels, said horizontally elongated pad being limited in length to be disposed between the inboard edges of the said sealing panels.

13. The dock shelter of claim 8 in which said sealing panels comprise flexible sheet material enclosing said pads.

* * * * *

UNITED STATES PATENT AND TRADEMARK OFFICE
CERTIFICATE OF CORRECTION

PATENT NO. : 4,062,157
DATED : December 13, 1977
INVENTOR(S) : David E. Potthoff It is certified that error appears in the above—identified patent and that said Letters Patent are hereby corrected as shown below:

Claim 5, first line (column 8, line 1) delete "claim 5 wherein" and substitute --claim 4 wherein--

Claim 6, second line (column 8, line 6) delete "comprises" and substitute --comprised--

Claim 12, first line (column 8, line 42) delete "claim 1 in" and substitute --claim 11 in--

Claim 12, first line (column 8, line 42) delete the comma at the end of the line Signed and Sealed this Twenty-seventh Day of June 1978

[SEAL]

Attest:

RUTH C. MASON
Attesting Officer

DONALD W. BANNER
Commissioner of Patents and Trademarks